United States Patent [19]

Steffes et al.

[11] Patent Number: 5,046,316
[45] Date of Patent: Sep. 10, 1991

[54] TANDEM MASTER CYLINDER WITH FILTERS ARRANGED IN CENTRAL VALVES

[75] Inventors: Helmut Steffes, Hattersheim; Philipp Kilb, Eppstein, both of Fed. Rep. of Germany

[73] Assignee: Alfred Teves GmbH, Frankfurt am Main, Fed. Rep. of Germany

[21] Appl. No.: 566,198

[22] Filed: Aug. 10, 1990

[30] Foreign Application Priority Data

Aug. 16, 1989 [DE] Fed. Rep. of Germany ....... 3927003

[51] Int. Cl.⁵ .................... B60T 11/20; B60T 11/28; F15B 7/08
[52] U.S. Cl. ........................................ 60/562; 60/454; 60/589
[58] Field of Search .................. 60/454, 533, 562, 586, 60/589, 591; 137/549

[56] References Cited

U.S. PATENT DOCUMENTS

| | | | |
|---|---|---|---|
| 2,679,729 | 6/1954 | Swift | 60/586 X |
| 4,472,941 | 9/1984 | Schopper et al. | 60/562 |
| 4,550,567 | 11/1985 | Schaeffer | 60/562 |
| 4,665,701 | 5/1987 | Bach | 60/562 X |
| 4,724,674 | 2/1988 | Fulmer | 60/570 X |
| 4,961,846 | 10/1990 | Isakson | 60/454 X |

FOREIGN PATENT DOCUMENTS

| | | |
|---|---|---|
| 3641712 | 6/1988 | Fed. Rep. of Germany . |
| 3712273 | 10/1988 | Fed. Rep. of Germany . |
| 3717706 | 12/1988 | Fed. Rep. of Germany . |
| 3815731 | 11/1989 | Fed. Rep. of Germany . |
| 2549429 | 1/1985 | France . |

*Primary Examiner*—Edward K. Look
*Assistant Examiner*—John Ryznic
*Attorney, Agent, or Firm*—Robert P. Seitter; J. Gordon Lewis

[57] ABSTRACT

A tandem master cylinder (1) with central valves (12, 37) positioned in the secondary piston (15), separate from the latter at the end of the cylinder bore (2) and arranged with filter elements (27, 28, 48, 49) upstream of the central valves (12, 37) so as to protect the latter from dirt. In order to be able simultaneously to reduce the total overall axial length, hydraulic fluid flows radially through the filter elements (27, 49) which become effective in the event of a backflow of hydraulic fluid and said filter elements (27, 49) are positioned on the pedal side in respect of the second stop (14) of the secondary piston (15), respectively radially aside the closing spring (46) of the second central valve (37).

6 Claims, 1 Drawing Sheet

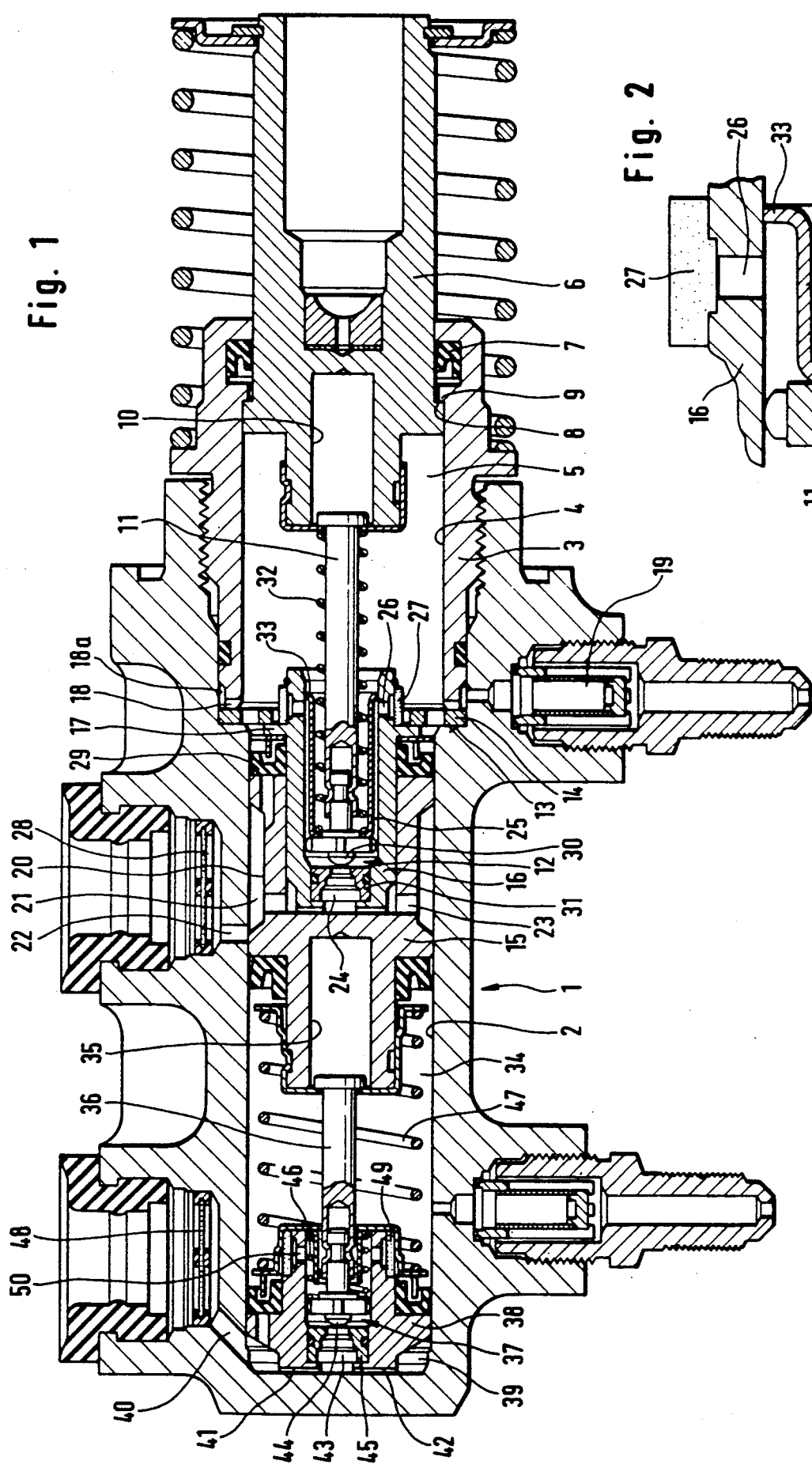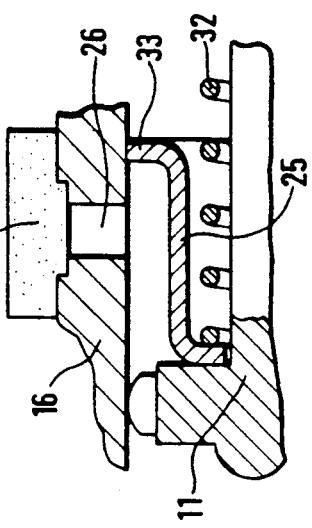
Fig. 1
Fig. 2

TANDEM MASTER CYLINDER WITH FILTERS ARRANGED IN CENTRAL VALVES

TECHNICAL FIELD

The present invention relates to a tandem master cylinder for a hydraulic brake unit of an automotive vehicle with two central valves, the first central valve being positioned in a valve accommodating element arranged in the secondary piston and the second central valve being positioned separately from the secondary piston, at the end of a longitudinal bore. This tandem master cylinder also has a first and a second stationary stop, with the stops interacting with the primary and the secondary piston separately from each other. This tandem master cylinder further includes a return spring disposed outside a cylinder housing, whereby the overall length is reduced.

BACKGROUND ART

A master cylinder of this kind is known from German patent application P 37 17 706.0. Because of a plurality of filter elements arranged before the valves and the pressure chambers, there is protection against soiling which can lead to a failure of the brake unit. In addition, design measures are described which result in a reduction of the overall axial length of the master cylinder. This latter aspect is, however, not consistently realized.

SUMMARY OF THE INVENTION

It is, therefore, an object of the present invention to provide an improved master cylinder of the kind referred to above so that the overall axial length is reduced even more in order to comply with the demands of automotive vehicle manufacturers for the supply of more compact and more light-weight mounted units which are reliable and protect the central valve from dirt which can jeopardize its regular functioning.

According to the present invention, this object is achieved by the filter element being positioned in the vicinity of the valve accommodating element which is disposed on the pedal side in respect to the second stop. The spring retaining cup is incorporated in the valve accommodating element, leading the flow of fluid from the filter to the first central valve, so that the latter will be protected from particles of dirt which could cause functioning disturbances if allowed to deposit in the vicinity of the valve seat.

According to one aspect of the present invention, the spring retaining cup advantageously slides sealedly at the valve accommodating element due to a seal being, for example, integrated in the spring retaining cup. This provision will save additional components.

According to another aspect of the present invention, the closing spring of the first central valve may take support at the spring retaining cup.

According to still another aspect of the present invention, a sealing cup is used to seal both the secondary piston in respect to the longitudinal bore and the valve accommodating element in respect of the secondary piston. This double function saves an O-ring and the groove required for it. As a result, assembly operations, component parts and, thus, costs will be saved.

As with the first central valve, the second central valve also is protected from soiling by filter elements disposed at the sealing element. Advantageously, these filter elements are positioned radially aside the closing spring of the second central valve. Consequently, they do not require any additional axial assembly space. Hydraulic fluid also flows through these filter elements in the radial direction and passes then directly on from there to the second central valve.

A preferred embodiment of the present invention and its mode of functioning will be described hereinafter with reference to the accompanying drawing.

BRIEF DESCRIPTION OF THE DRAWING

In the drawing:

FIG. 1 is an axial section of a master cylinder constructed in accordance with the present invention; and FIG. 2 is a detailed illustration of the spring retaining cup and the adjacent area.

DETAILED DESCRIPTION OF THE INVENTION

FIG. 1 shows the master cylinder 1 which includes a longitudinal bore 2 and which is closed by a threaded bushing 3 at its end facing a vacuum booster which is not shown in the drawing. The axial bore 4 of the threaded bushing 3 forms the primary pressure chamber 5 and, within it, the primary piston 6 is configured in the shape of a plunger which is slidable in the axial direction and sealed by means of a seal 7. In this context, the axial movement of the primary piston 6 is limited by a radial ring-shaped shoulder 8 on primary piston 6 which interacts with a radial stop surface 9 molded on the threaded bushing 3. Radial stop surface 9 forms a first stop. In its front portion projecting into the primary pressure chamber 5, the primary piston 6 is formed with an axial recess 10 which, in the event of actuation of the master cylinder 1, accommodates a tappet 11 which is part of the first central valve 12 and whose mode of functioning will be described further below.

Between the threaded bushing 3 and a radial ring-shaped surface 13 in the master cylinder 1, an annular disc 14 is positioned. This annular disc having a plurality of openings forms the stationary second stop for a stop surface 17 on the valve accommodating element 16 which is incorporated in the secondary piston 15. Slots 18 are provided in the threaded bushing 3 to form the hydraulic fluid connection between the primary pressure chamber 5 and an annular chamber 18a, for a connecting branch 19 for a first brake circuit.

In its surface the secondary piston 15 is formed with a radial recess 20 which jointly with the wall of the longitudinal bore 2 of the master cylinder 1 defines an intake chamber 21 for the primary pressure chamber 5 which, through the connecting bore 22, is linked, on one side, to the supply tank, not shown in the drawing, and, on the other side, to the primary pressure chamber 5 through a radial hydraulic fluid passage 23 and the axial connecting duct 24, the open first central valve 12 positioned in the valve accommodating element 16 in the secondary piston 15 and past the spring retaining cup 25 through radial bores 26 in the valve accommodating element 16 and through first filter elements 27 covering them. The first central valve 12 closes as soon as the primary piston 6 moves to the left as shown in FIG. 1. In addition, hydraulic fluid can pass from the supply tank into the primary pressure chamber 5 through a second filter element 28 and the intake chamber 21 past the sealing cup 29 which works as a non-return valve and which seals off both the secondary piston 15 in respect of the longitudinal bore 2 and the valve accommodating element 16 in respect of the secondary piston 15, through the openings in the annular disc 14.

The first central valve 12 is comprised of the tappet 11 which ends in a hemispherical closing member 30 interacting with a valve seat 31 which is incorporated in the valve accommodating element 16. To the tappet 11, the spring retaining cup 25 is secured at which a closing spring 32 takes support. The other end of spring 32 is in abutment against the primary piston 6. Spring 32 tends to close the central valve 12. End 33 of the spring retaining cup 25 sealedly slides in the valve accommodating element 16 and leads the hydraulic fluid from the central valve to the radial bore 26 and vice versa.

At its end facing the secondary pressure chamber 34, the secondary piston 15 has an axial recess 35 which, in the event of actuation of the master cylinder 1, receives a tappet 36 of the second central valve 37 which is accommodated in a two-part closing element 38 which is sealedly positioned at the end of the longitudinal bore 2. Jointly with a radial recess in the closing element 38, the wall of said longitudinal bore 2 defines an intake chamber 39 for the secondary pressure chamber 34, which is in connection, on one side, through the connecting bore 40 with the supply tank not shown in the drawing and, on the other hand, with the secondary pressure chamber 34 through a radial passage 41, a duct 42 formed between the front wall of the closing element 38 and the end of the longitudinal bore 2, the axial connecting duct 43 and the open second central valve 37. The second central valve 37 is comprised of the hemispherical end of the tappet 36 serving as a closing member 44 and a valve seat 45. The tappet 36 is prestressed in the closing direction of the valve by means of a closing spring 46. Between the closing element 38 and the secondary piston 15, a return spring 47 is interposed which, in the position of rest of the master cylinder 1, provides a safe abutment of the secondary piston 15, specifically the valve accommodating element 16, against the disc 14. The second central valve 37 is protected from soiling by means of filter elements 48, 49 positioned in its vicinity. The filter element 48 is arranged in the connecting eye of the hydraulic fluid reservoir, while the filter elements 49 are arranged in radial bores 50 in the closing element 38 which are situated between the secondary pressure chamber 34 and the second central valve 37.

FIG. 2 is an enlarged, but not to scale, illustration of the spring retaining cup 25, the radial bore 26 in the valve accommodating element 16, the first filter element 27 as well as the tappet 11 and the closing spring 32 in an identical illustration as above.

What is claimed is:

1. A tandem master cylinder for a hydraulic brake unit of an automotive vehicle, said tandem master cylinder comprising:

a housing having a longitudinal bore;
a primary piston;
a secondary piston;
a valve accommodating element positioned within said secondary piston and having radial passages through which hydraulic fluid flows;
a first central valve positioned within said valve accommodating element;
a second central valve spaced from said secondary piston and positioned within said longitudinal bore at an end thereof;
filter means for filtering hydraulic fluid flow through said radial passages of said valve accommodating element;
a spring retaining cup sealedly positioned in said valve accommodating element and forming, with said valve accommodating element, an annular chamber between said spring retaining cup and said valve accommodating element through which hydraulic fluid passes to said first central valve when a brake, to which tandem master cylinder is responsive, is released;
a first stationary stop positioned to control movement of said primary piston;
and a second stationary stop positioned to control movement of said secondary piston.

2. A tandem master cylinder according to claim 1 wherein said spring retaining cup is slidable within said valve accommodating element.

3. A tandem master cylinder according to claim 2 further including a closing spring supported at one end by said spring retaining cup and urging said first central valve to close.

4. A tandem master cylinder according to claim 3 further including a sealing cup positioned to seal off said secondary piston from said longitudinal bore and to seal off said valve accommodating element from said secondary piston.

5. A tandem master cylinder according to claim 1 further including:
(a) a closing element within which said second central valve is positioned and having passages through which hydraulic fluid flows;
(b) a secondary pressure chamber;
(c) second filter means for filtering hydraulic fluid flowing through said passages of said closing element from said secondary pressure chamber to said second central valve; and
(d) a closing spring urging said second central valve to close.

6. A tandem master cylinder according to claim 5 wherein said passages in said closing element are disposed radially and said second filter means are radially inside said closing spring.

* * * * *